United States Patent [19]

Romano

[11] Patent Number: 4,857,036

[45]· Date of Patent: Aug. 15, 1989

[54] REAR DERAILING DEVICE FOR BICYCLE GEARS

[75] Inventor: Antonio Romano, Padua, Italy

[73] Assignee: Campagnolo S.p.A., Vincenza, Italy

[21] Appl. No.: 143,086

[22] Filed: Jan. 12, 1988

[30] Foreign Application Priority Data

Jan. 12, 1987 [IT] Italy .................. 52822B/87[U]

[51] Int. Cl.[4] ............................................. F16H 11/00
[52] U.S. Cl. ............................................ 474/80; 474/82
[58] Field of Search ................................... 474/79–82

[56] References Cited

U.S. PATENT DOCUMENTS 3,181,383  5/1965  Juy ......................................... 474/82
4,692,131  9/1987  Nagano ................................... 474/80

Primary Examiner—Jerome W. Massie
Assistant Examiner—Matthew Smith
Attorney, Agent, or Firm—Kenyon & Kenyon

[57] ABSTRACT

A rear derailing device for bicycle gears comprises a first body intended to be fixed to the frame, a second body, a lower body for driving the bicycle chain, and an articulated parallelogram joint connecting the first body to the second body. The joint has end heads which are connected to the first body and the second body respectively by swivelling hinge connections. The two elements of each hinge connection have facing surfaces with frontal teeth which cooperate with each other to hold the two elements of the hinge connection in a preselected relative position. The elements can be locked in this position by a locking screw arranged to press the facing surfaces against each other.

3 Claims, 2 Drawing Sheets

REAR DERAILING DEVICE FOR BICYCLE GEARS

The present invention relates to rear derailing devices for bicycle gears, of the type comprising a first body intended to be fixed to the frame of the bicycle, a second body, carrying means for driving the bicycle chain, and an articulated parallelogram joint connecting the first body to the second body, said joint having two end heads connected to each other by two connecting rods, said end heads being connected to the first body and the second body respectively by means of swivelling hinge connections.

A derailing device of the type indicated above is described and illustrated in the Italian utility model application No. 22375-B/83 by the same Applicant.

The object of the present invention is to improve the device proposed previously to make it more reliable and functional.

The principal characteristic of the invention lies in the fact that the two elements of each of said hinge connections have facing surfaces with frontal teeth which cooperate with each other to hold the two elements of the hinge connection in the preselected relative position, and in that the elements can be locked in this position by means of a locking screw intended to press the facing surfaces against each other.

The present invention will now be described with reference to the illustrated drawings, provided purely by way of non-limiting example, in which.

Figure 1:
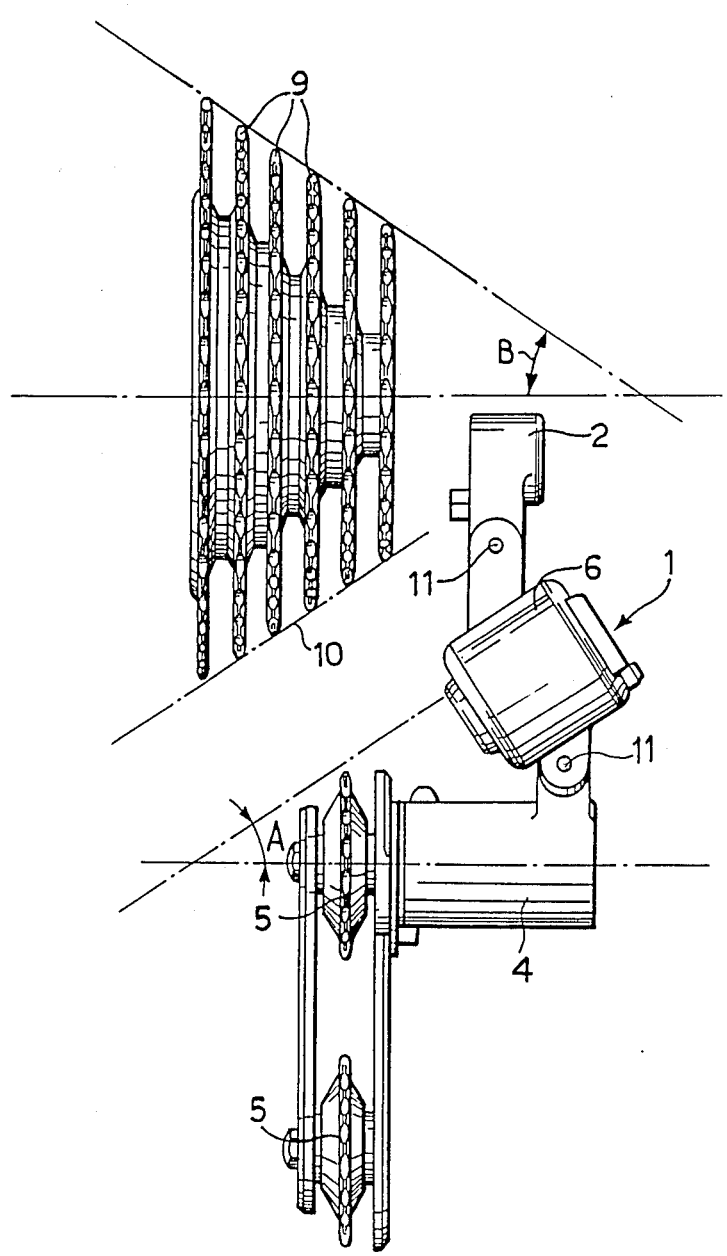
FIG. 1 is a schematic view of a known derailing device.

With reference to FIG. 1, a rear derailing device for bicycle gears, of the type which is the subject of the previous Italian utility model application No. 22375-B/83 by the same Applicant, is generally indicated 1. The derailing device 1 comprises an upper body 2 intended to be fixed to a part 3 (this part is illustrated in FIG. 3 with reference to the device according to the invention) of the bicycle frame and a lower body 4 carrying two wheels 5 for driving the bicycle chain. The upper body 2 and the lower body 4 are connected to each other by means of an articulated parallelogram joint 6 substantially similar to that illustrated in FIG. 2 with reference to the device according to the invention. The joint 6 comprises two end heads 7 (one of which is visible in FIG. 1) connected to each other by means of two connecting rods 8. The joint 6 is arranged so that the plane of oscillation of the articulated parallelogram is a plane parallel to the longitudinal direction of the bicycle and is at an angle A to the horizontal (FIG. 1). According to conventional techniques, the articulated parallelogram joint is provided with an attachment (not visible in the drawings) for the control cable for the derailing device. In conventional manner, the cyclist operates the cable to vary the configuration of the articulated parallelogram and align the driving wheels 5 with the preselected sprocket of the hub of the rear wheel of the bicycle. FIG. 1 also illustrates the sprockets associated with this hub (reference numeral 9). As can be seen, the imaginary cone 10 defined by these sprockets has a half angle of opening B which is equal to the angle A defined above. However, when the derailing device is operated, the driving wheels 5 are kept at a constant distance from the sprockets 9. Naturally, when the sprockets 9 are replaced by sprockets of different diameters, the angle B may be altered, whereby it is necessary to modify the angle A between the plane of oscillation of the articulated parallelogram 6 relative to the horizontal. For this purpose, the device which is the subject of the previous proposal provided two swivelling hinge connections 11, between the upper body 2 and the end head 7 of the articulated parallelogram which is connected thereto, and between the lower body 4 and the end head 7 which is connected thereto.

The present invention proposes an improved solution for the hinge connections.

Figure 2:
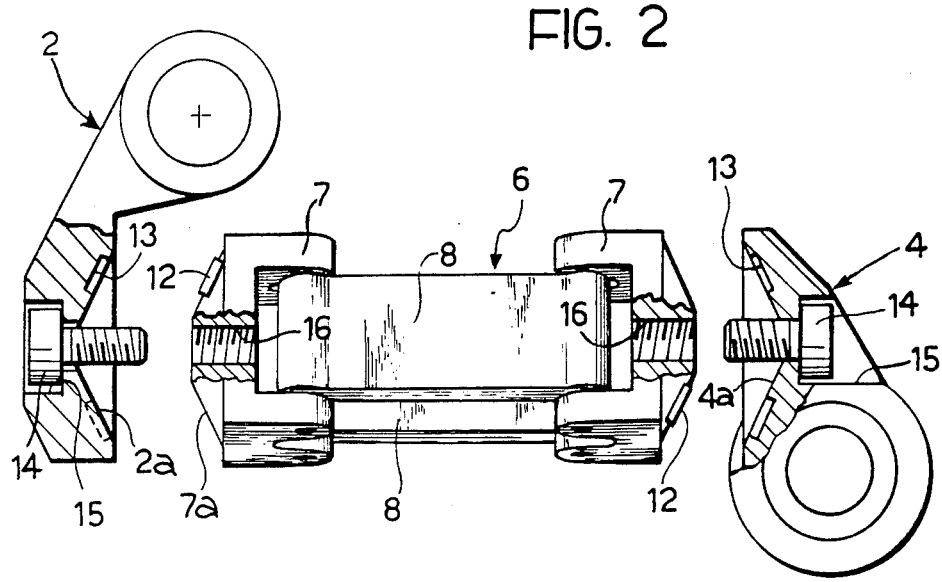
FIGS. 2 and 3 are a sectional view and a perspective view which show the derailing device according to the invention in an exploded condition.
Figure 3:
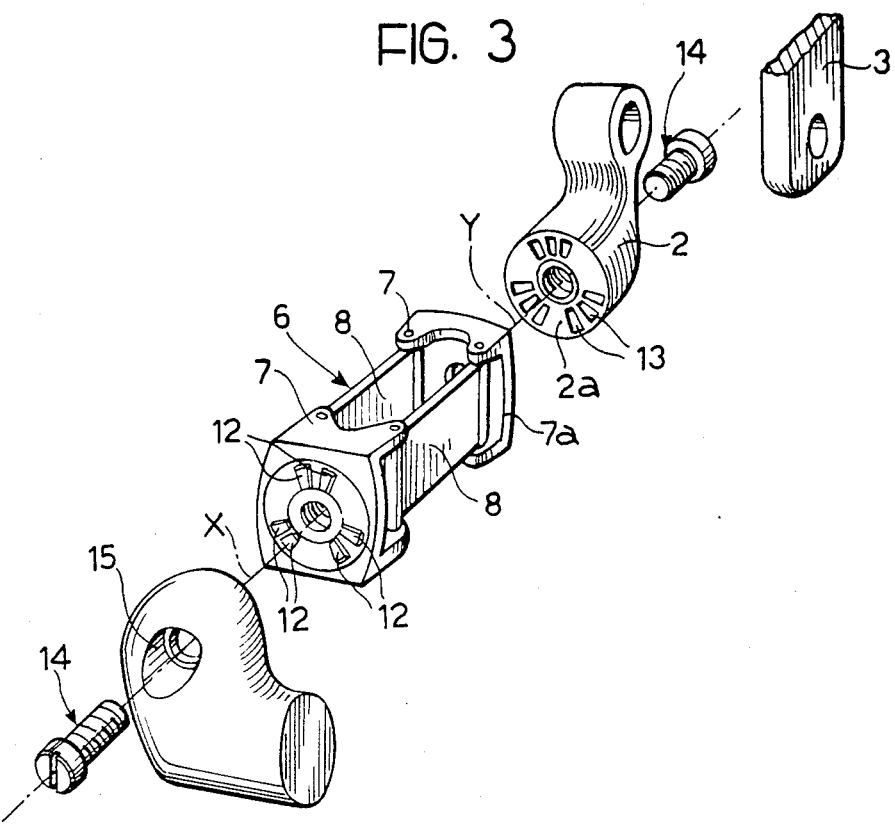

With reference to FIGS. 2 and 3, in which the parts in common with FIG. 1 are indicated by the same reference numerals, the two end heads 7 of the articulated parallelogram joint 6 and the upper and lower bodies 2, 4 of the derailing device have facing surfaces 2a, 7a and 7a, 4a with frontal teeth 12 intended to cooperate with each other to hold the two elements of each hinge connection in the relative preselected position. More precisely, the surfaces 7a of the two end heads 7 (only one which is visible in FIG. 3) have frontal teeth 12 (in the example illustrated, three pairs of equiangularly-spaced teeth) extending radially and arranged to cooperate with notches 13 provided in the surface 2a of the upper body 2 and in the surface 4a of the lower body 4 (in the example illustrated, three equiangularly-spaced groups of three notches).

The two elements of each hinge connection (the axes of the two hinges are indicated X and Y respectively) can be locked in the preselected relative position by means of an axial screw 14. The screw 14 passes through a through-hole in the lower body 4 with clearance and engages a threaded hole 16 formed in the respective end head 7 (or, alternatively, a nut incorporated in this end head). The screw 14 is thus used both for locking the hinge connection in the selected position and as an articulation pin for the hinge, for varying the relative positions of the two hinge elements when the screw is loosened.

The solution which is the subject of the present invention has the advantages of enabling a more rigid connection to be made between the various elements of the derailing device, of permitting faster and easier adjustment operations, and of being more reliable.

Naturally, the principle of the invention remaining the same, the details of construction and forms of embodiment may be varied widely with respect to those described and illustrated purely by way of example.

I claim:

1. A rear derailing device for bicycle gears on a bicycle having a frame, comprising: a first body intended to be fixed to the frame, a second body carrying means for driving a bicycle chain, and an articulated parallelogram joint connecting the first body to the second body, said joint having two end heads connected to each other by two connecting rods said end heads being connected to the first body and the second body respectively by means of swiveling hinge connections, wherein each hinge connection is comprised of two elements arranged for relative rotation and having facing surfaces with frontal teeth which cooperate with each other to hold said two elements in a preselected relative position, and in that a locking screw is provided to press said facing surfaces against each other so as to lock said two elements in the preselected relative position.

2. A detailing device according to claim 1, wherein one of the two facing surfaces has a plurality of radially extended and angularly spaced frontal teeth and in that the other facing surface has a plurality of notches arranged to receive the teeth.

3. A derailing device according to claim 1, wherein two locking screws engage respective through-holes in the first body and the second body with clearance, and threaded holes provided in respective end heads of the articulated parallelogram joint.

* * * * *